United States Patent [19]

VanSice et al.

[11] 4,398,435
[45] Aug. 16, 1983

[54] SELF-POSITIONING AND SELF-ADJUSTING PRESS GUARD

[75] Inventors: William S. VanSice, DuBois; Jonathan L. Sweka, Reynoldsville; Keith G. Marshall, Luthersburg, all of Pa.

[73] Assignee: The Marmon Group, Inc., Chicago, Ill.

[21] Appl. No.: 272,403

[22] Filed: Jun. 10, 1981

[51] Int. Cl.³ .............................. F16P 1/02; F16P 3/10
[52] U.S. Cl. ....................................... 74/612; 192/133
[58] Field of Search .................. 74/608, 612, 613, 614, 74/615, 616; 192/133, 134

[56] References Cited

U.S. PATENT DOCUMENTS

| | | | |
|---|---|---|---|
| 2,404,675 | 7/1946 | Vosburg | 74/615 |
| 3,587,344 | 6/1971 | Plumb | 74/612 |
| 3,877,859 | 4/1975 | Crazine | 74/616 X |
| 4,129,048 | 12/1978 | Shocklee | 74/612 |
| 4,137,795 | 2/1979 | Lindquist | 74/613 |

FOREIGN PATENT DOCUMENTS 1408002 10/1975 United Kingdom ................ 192/133
2053404 2/1981 United Kingdom ................ 192/133

Primary Examiner—Louis Rimrodt
Attorney, Agent, or Firm—Neuman, Williams, Anderson & Olson

[57] ABSTRACT

An improved safety device or guard for use upon a press or other machine, which has a work zone for receiving a work piece, is provided to protect the operator. The guard has a base with sloped surfaces leading to the work area and slidable gates positioned adjacent said base. The operator inserts the work piece by moving it along the sloped surfaces of the base until it contacts the gates and forces the gates upward. The gates are raised only by an amount which is sufficient to allow the work piece to move into the work zone. The gates ride upon the top of the work piece and automatically adjust for various thicknesses of the work piece during the operation of the machine. The guard has flange members which are attached to the base for slidably mounting the guard to a machine and has a barrier mounted upon the base which is angled inwardly toward the work zone for permitting the use of work pieces which are shorter than the overall width of the barrier.

10 Claims, 5 Drawing Figures

SELF-POSITIONING AND SELF-ADJUSTING PRESS GUARD

BACKGROUND OF THE INVENTION

The present invention is a protective guard, intended for use with a punch press, drill press or other power tool. The guard is designed to prevent the operator of the machine from placing his hands or other objects into the work zone of the machine when he is either operating the machine or attempting to remove a work piece which has become jammed in the machine. In addition, the protective guard prevents fragmented segments of the work piece from striking the machine operator. Thus, the guard is a safety device for preventing injury to the operator.

Protective guards of this general type are well known, and a common feature of such known devices is a cage or other similar barrier which encircles the work zone of the machine, but which has an opening to permit insertion of the work piece. The principal function of such guards is to provide the operator with protection from injury while preserving sufficient visibility of the work zone to permit adequate control of the operation of the machine upon a work piece.

In order to make such guards commercially useful, it is necessary that they be easily attached to and removed from the machine and that the operator be able to quickly and accurately adjust the size and shape of the opening in order to accommodate work pieces of varied size and shape. The latter feature is of particular importance due to the requirements for conforming the size of the opening to the size of the work piece which have been set by regulations promulgated under the Occupational Safety and Health Act. In addition, the general size and structure of the guard itself should desirably be such as to permit the use of a wide range of sizes of work pieces without requiring the operator to devote substantial time to the adjustment of the guard, which, in turn, results in increased down time for the machine. Furthermore, the guard should perform each of these functions without posing hazards to the machine operator due to the structural configuration of the device itself. None of the known prior art devices have been able to meet these standards.

As noted, the common feature of the prior art devices is a cage or similar structure which serves as a barrier to the hand of the operator. It is this barrier which defines the work zone of the machine by enclosing the punch ram (or equivalent machine member), the die or base plate and a portion of the flat work bed of the machine. In these prior art devices the barrier is customarily formed by a series of either vetically- or horizontally-oriented rods or tines. The rods are, in turn, either held in place by a frame or attached to each other by a series of fasteners so that they alone form the barrier. In either form of the barrier, the rods are secured in such a fashion as to allow adjustment by either sliding or pivoting movement. In several of the prior art devices the barrier consists of two or more structurally independent panels, each of which is composed of such rods.

In most of the prior art devices, adjustment of the guard to accommodate work pieces of various sizes and shapes is accomplished by individually adjusting each pivoting or sliding rod so as to conform the size of the opening to the size of the work piece. In these prior art devices this adjustment often requires the operator to loosen the pin, screw or other fastener which secures each rod or tine, move the tine and then re-tighten the fastener. In order to make a precise and exact adjustment of the size of the opening, the operator often must repeat this process numerous times, thus wasting a great deal of otherwise productive machine time.

In addition to the loss of time caused by these adjustments, there is another disadvantage of those prior art devices in which individual rods or tines make up the barrier. When a number of individual tines are slid or pivoted so as to create an opening which will admit a work piece, the ends of these tines necessarily protrude from the safety device, either upwardly or outwardly. In both instances these protruding tine ends present a signficant risk of injury to the operator. While an operator is working at a machine equipped with such a safety device, his face and head are especially vulnerable to injury from these protruding tines.

Another deficiency of the prior art devices is that a substantial amount of time and effort is required to detach the guard from the machine to an extent sufficient to permit access to the die or other operative part of the machine. The amount of work involved in detaching and reattaching the guard increases the loss of time and money caused by longer set-up times and also increases the likelihood that, once removed, the safety device will not be re-attached to the machine.

The prior art devices are commonly mounted upon the machine by bolts and must, therefore, be completely detached from the machine whenever set-up for a new job is required. Some of the devices are, however, bolted to the machine by way of one or more hinges. While portions of the barrier may consequently swing away from the work area of the machine during the set-up period, there still must be considerable time and effort expended in order to release the additional bolts or other fasteners which permit the device to be pivoted on its hinges. Other means for attaching these prior art safety devices to machines have been devised, e.g., brackets; however, these too require the device to be totally removed from the machine during set-up.

Yet another deficiency of the prior devices is that, while in place on the machine, they do not permit the operator to insert work pieces which are shorter than the width of the entire protective barrier. Thus, the devices are useful only when work pieces are used which are as long or longer than the width of the box-like enclosure formed by the barrier.

In summary, the devices of the prior art are time-consuming to adjust, are time-consuming to remove and re-attach, are themselves a hazard to the operator and are limited as to the shortest work piece which they will accommodate.

SUMMARY OF THE INVENTION

The safety device of the present invention comprises a generally U-shaped base which has a cross-member and right and left arms. An upper surface of the base is formed by the cross-member and the forward portions of the arms, while the middle and rear portions of the arms form inclined and lower surfaces, respectively. When the operator inserts a work piece into the work zone of the machine to which the safety device is attached, the work piece slides down the inclined surface portion of the arms and comes to rest upon the lower surfaces of the arms.

Right and left flange members are attached to the arms of the base, and these flange members engage flange-lip members which are attached to the work bed of the machine. The guard is slidably mounted to the machine by engaging the flange members with the flange-lip members. When the device is fully attached to the machine the flange members are prevented from sliding outwardly by a pivotal flange detent. One end of the flange detent is attached to a flange-lip member by means of a spring and the other end is in contact with a flange member. The detent, when pivoted by the operator, moves out of the path of the flange member, thus permitting the device to slide away from the machine.

Right and left support members are attached to the base and a cage-type barrier is mounted upon the support members.

The barrier comprises an upper barrier frame member, a first lower barrier frame member, a second lower barrier frame member and a plurality of vertically-disposed rods. The rods are rigidly attached at their ends between the upper frame member and the second lower frame member in order to form a cage-like structure for protecting and isolating the operator. The barrier further comprises right and left right-angled plates, attached to the middle portions of the rear-most of the rods previously described. These plates are further supported by rods which are angled in towards the work zone of the machine and are attached to the second lower frame member. Because each of the rods which comprise the barrier are angled inwardly, the width of the barrier is reduced at the point where the work piece is introduced into the work zone. Accordingly, the operator may introduce a work piece which is shorter in length than the widest portion of the barrier. In addition, because the rods are rigidly attached at their ends to the frame members, they cannot be made to project beyond the frame members. The operator is not exposed to individual barrier tines extending outwardly from the guard.

A pair of vertically-slotted gate members is slidably mounted upon the first lower barrier frame member by means of bolts and plastic washers.

The first gate member is attached at the entrance to the work area while the second gate member is attached to the exit opening to the work area. The side of each gate member adjacent to the forward portion of the barrier has a curved or rounded surface. The curved surface of each gate member cooperates with the inclined surface of the inclined portions of the arms of the base. When the operator inserts a work piece, the work piece contacts the inclined portion of the arms and the rounded portion of the gate member which results in a camming action which forces the gate members to slide upward. The work piece is positioned upon the lower surfaces of the arms of the base and the gate members rest upon the top surface of the work piece. Thereafter, during operation of the machine, the gate members move along the top surface of the work piece and automatically adjust the size of the opening to the work area to correspond to changes in the thickness of the work piece.

It is an object of the invention to provide a safety device with automatic, continuously adjusting gate means which operate in conjunction with sloped surfaces of the base to receive work pieces of varying size while blocking the entry of the operator's hand into the work zone.

Another object is to provide a means for mounting a safety device upon the work bed of a machine in such a fashion as to permit the device to slide away from the work zone of the machine during set-up of the machine.

A further object of the present invention is to provide for the use of work pieces which are shorter than the widest dimension of the barrier by providing a barrier comprising vertically-oriented rods which are, in their lower portions, angled inwardly toward the work zone.

Additionally, it is an object of the invention to provide a barrier comprising integral frame and rod members which has no dangerous protrusions which could create a risk of injury to the operator.

Finally, it is an object of the invention to provide a safety device which meets the requirements of regulations promulgated under the Occupational Safety and Health Act.

Other objects and advantages of the invention will become apparent from the following detailed description and appended claims and from the accompanying drawings.

DESCRIPTION OF THE DRAWINGS

The present invention may be more completely understood by referring to the embodiment illustrated in greater detail in the accompanying drawings and described below by way of an example of the invention.

DETAILED DESCRIPTION

The following is a description of the preferred embodiment of the invention. The device so described and depicted in FIGS. 1-5 is preferred, but but is only one embodiment which may be constructed in accordance with the teachings of the invention; for, the full extent of the invention is defined in the claims appended hereto.

Figure 1:
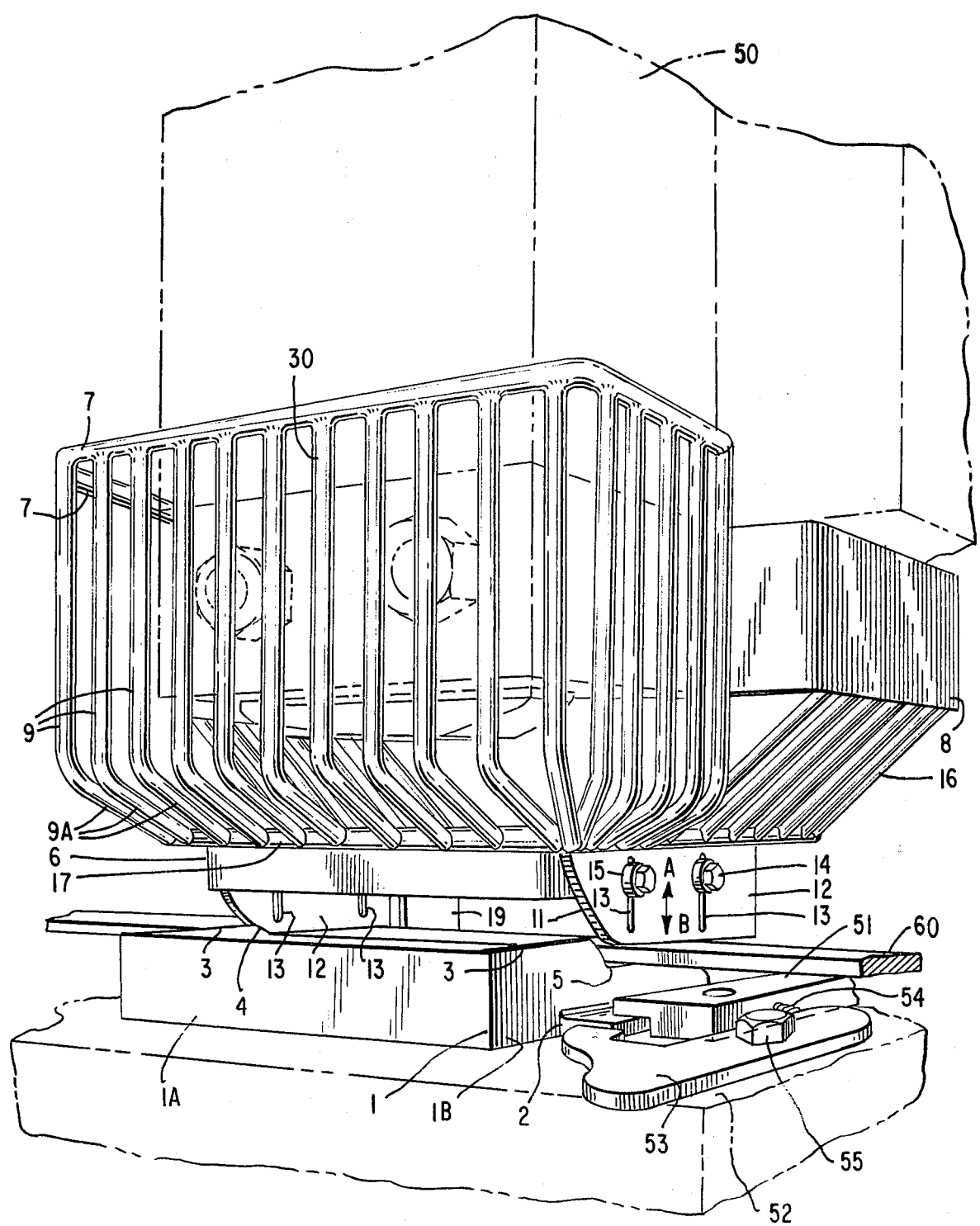
FIG. 1 is a perspective view of a press guard constructed in accordance with the present invention which is shown mounted upon the bed of a representative power tool (shown in phantom form) with a representative work piece in the work zone.

The protective guard of the invention is illustrated in FIG. 1 mounted upon a representative machine 50, which is shown in phantom form as having a bed 52 and flange-lip members 51 attached to said bed 52. The guard is generally constructed of a base 1, support members 19 attached to said base 1, a cage-type barrier 30 mounted upon said support members 19 and gate means 12 slidably mounted upon the lower portion of said barrier 30, all as more fully described below.

Figure 4:
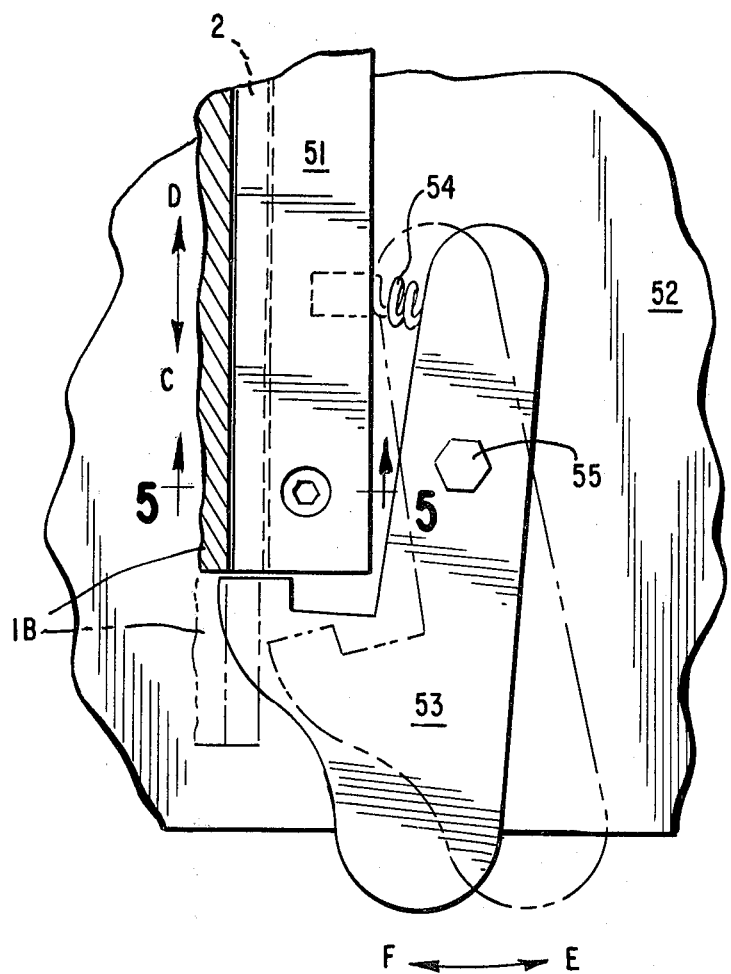
FIG. 4 is a full-scale plan view of the pivotal flange detent which, together with the flange-lip members, secures the guard to the machine bed.
Figure 5:
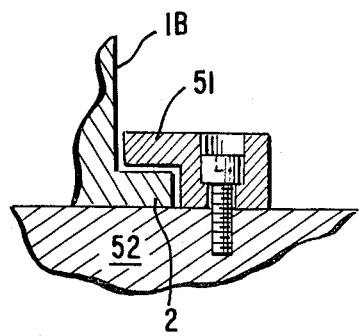
FIG. 5 is a section view, taken across line 5—5 of FIG. 4, of the flange-lip and flange members, which shows the means by which the guard is slidably mounted to the machine bed.

As further shown in FIG. 1, the base 1 has flange members 2 integrally attached to the base 1. Flange-lip members 51 are attached to the machine bed 52. The flange members 2 engage flange-lip members 51 for slidably mounting the guard upon the machine bed 52. The engagement of flange members 2 with flange-lip members 51 is shown in detail in FIG. 5. Depicted in FIGS. 1 and 4 is pivotal flange detent 53, pivotally attached to machine bed 52 by bolt 55. As shown in FIG. 4, pivotal flange detent 53 is spring-loaded by spring members 54. One end of said spring member 54 attached to flange detent 53 and the opposite end of spring member 54 is connected to flange-lip member 51. When pivotal flange detent 53 is pivoted from its resting position E to its pivoted position F, thus compressing spring member 54, flange member 2 (and hence the guard) is free to slide away from the machine along line C-D in direction C.

Figure 2:
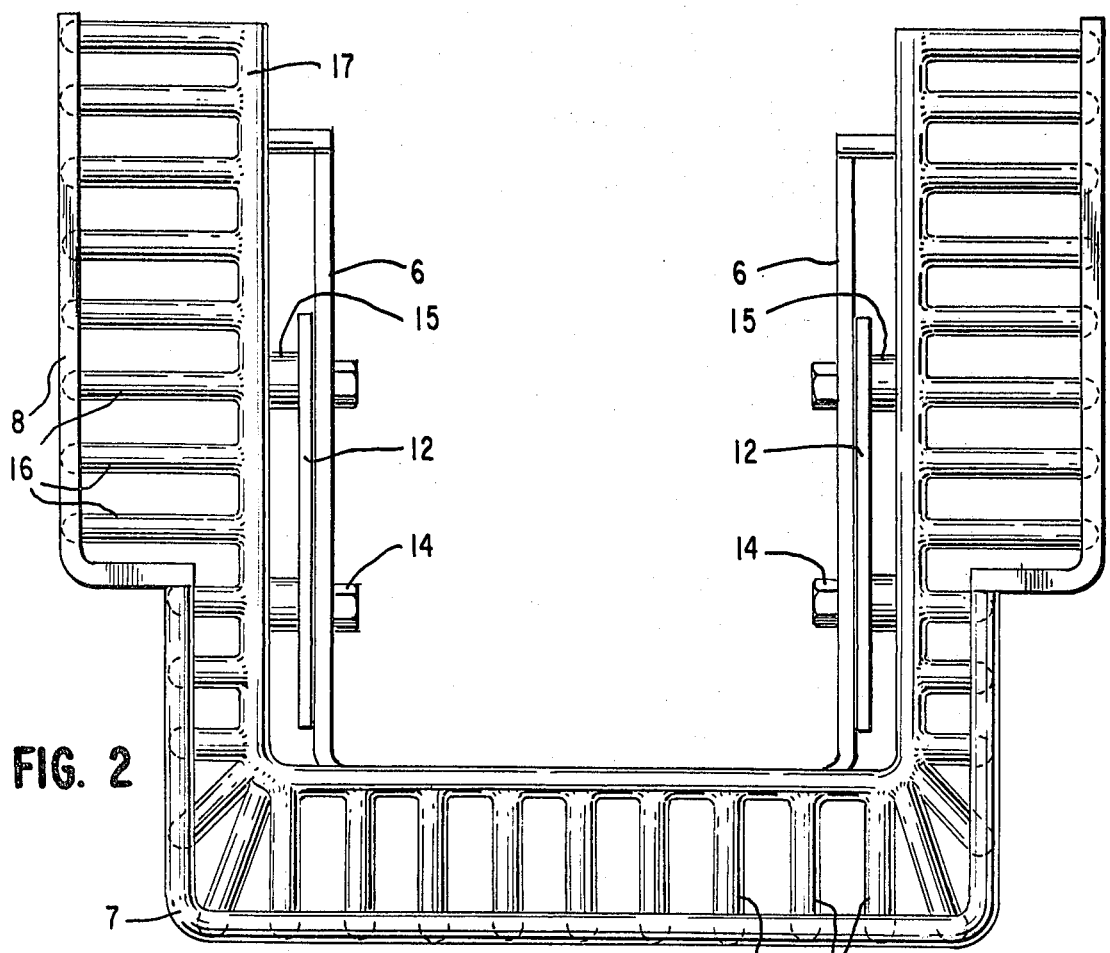
FIG. 2 is a top view which shows the areas, defined by the first and second lower frame members of the barrier assembly, through which the vertically-slidable gate members may pass when they are pushed upward by the insertion of a work piece into the work zone.
Figure 3:
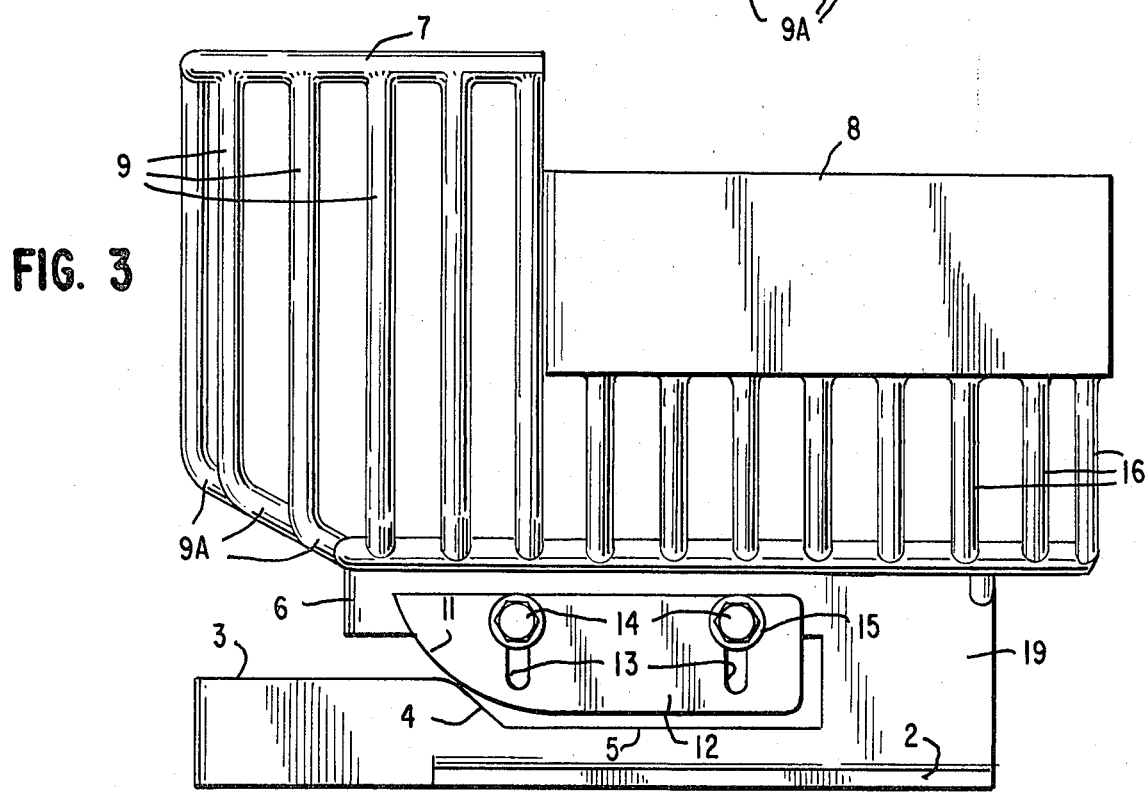
FIG. 3 is a side view of the press guard which shows the cooperating relationship between the upper, lower and inclined base surfaces and the corresponding slidable gate.

Further details of the construction of the base 1 appear in FIGS. 1, 2 and 3. The entire guard, including the base 1, is generally U-shaped. The base 1 has cross-member 1A and arms 1B. An upper surface 3 of base 1 is formed by cross-member 1A and the front portions of arms 1B. Inclined surfaces 4 of arms 1B connect upper surface 3 to lower surfaces 5 of arms 1B. The lower surfaces 5 of arms 1B receive a work piece 60 to be worked by said machine 50.

FIGS. 1 and 3 additionally show that vertical support members 19 are attached to base 1 at the rear portions of lower surfaces 5.

As depicted in FIGS. 1 and 3, barrier 30 is mounted upon support members 19 by the attachment of first lower barrier frame member 6 and second lower barrier frame member 17 to said support members 19. The height of support members 19 is such as to provide an opening between upper base surface 3 and first lower barrier frame member 6 which is of sufficient size to permit the operator to insert a work piece into the work zone while blocking the entry of the operator's hand. As shown by FIG. 2, lower frame members 6 and 17 are, like base 1, generally U-shaped.

Barrier 30 is illustrated in FIGS. 1–3 as comprising lower frame members 6 and 17, upper barrier frame member 7, and vertically-disposed rods 9 rigidly attached at their upper ends to frame member 7 and at their lower ends to second lower frame member 17. Thus, the barrier 30 is a cage-type enclosure surrounding the work zone of the machine 50 which prevents the operator from placing his hands into the work zone and protects the operator from being struck by fragmented segments of the work piece 60 while permitting him to view the operation of the machine upon the work piece. Lower rod portions 9A of rods 9 are angled inwardly toward machine 50, inasmuch as upper frame member 7 is of larger dimensions than lower frame member 17. This arrangement provides a barrier which is more narrow at the point where the work piece is inserted, so that work pieces which are shorter than the overall width of the guard may be successfully worked with the guard in place. Additionally, barrier 30 further comprises vertically-disposed right-angled plates 8 which are attached to the middle portions of the rear-most rod 9 on each side of the barrier 30 and which are supported by rods 16. In this preferred embodiment, rightangled plates 8 conform to the sides of machine 50, completing the enclosure of the work zone by barrier 30 at the places where it is unnecessary that the operator be able to view the particular part of machine 50. Rods 16 are, in a fashion similar to lower rod portions 9A, angled toward machine 50 and are connected to lower frame member 17.

Shown in FIGS. 1–3 are gate members 12, each having a front curved surface 11 and vertical slots 13. Gate members 12 are slidably mounted upon lower frame member 6 by means of bolts 14 passing through slots 13 and plastic washers 15 so as to permit free movement of gate members 12 in the directions indicated by line A-B in FIG. 1.

Under conditions of actual use, a work piece (such as the representative work piece 60 in FIG. 1) is introduced into the work zone of the machine 50 by first laying it upon upper base surface 3, and by pushing it down inclined base surfaces 4 back toward machine 50. As the work piece travels down inclined surfaces 4, it strikes gate members 12 on curved surfaces 11 (FIGS. 1 and 3), thereby causing gates 12 to slide upward between first lower barrier frame member 6 and second lower barrier frame member 17 (FIG. 2) and causing gates 12 to ride upon the upper surface of the work piece 60. Gates 12 continue to ride upon the work piece 60 as it is pushed onto lower base surfaces 5 and into the work zone. When the work piece 60 is fully inserted into the work zone, gates 12 rest upon the upper surface of the work piece 60.

By referring to FIG. 3, one can clearly see that the opening between upper base surface 3 and lower barrier frame member 6 is of sufficient height to admit a work piece, but is sufficiently narrow so as to block the entry of the operator's hand from the front of the device. Additionally, it is plain that gate members 12, being freely slidable upon bolts 14, block the entry of the operator's hand from the sides of the device, whether said gate members are in their raised positions (FIG. 1) or in their lowered positions (FIG. 3). Gate members 12 automatically return to the fully closed position after the work piece 60 advances past the gate. Accordingly, the gate members 12 cannot be held open so as to permit access to the work zone unless the work piece 60 is actually in the machine and then only to the degree necessary to permit entry of the work piece.

As can be further seen from an examination of FIG. 2, the construction of the barrier 30, specifically the relative sizes of the upper (7) and lower (6 and 17) frame members, the angled rods 16 and the angled rod portions 9A, permits the introduction of work pieces which are substantially shorter than the width of the barrier 30 (the distance between plates 8) into the work zone (the area between plates 12) without any reduction in the protection afforded by the device.

The foregoing description of the preferred embodiment clearly demonstrates that the instant invention provides an improved protective guard of simple construction which automatically adjusts itself to admit work pieces of varied size, which is easily attached to and removed from the work bed of the machine, which permits the use of work pieces shorter than the width of the barrier and which itself poses no risk of injury to the machine operator.

While the instant invention and its operation have been described in detail by referring to a specific preferred embodiment thereof, variations, modifications and substitution of equivalent structural elements are understood to be within the scope and spirit of this invention.

We claim:

1. A safety device for protecting the operator of a machine, said machine having a work zone and being capable of receiving a work piece, said safety device comprising:

(a) a base having an inclined surface for receiving said work piece and directing said work piece into said work zone;

(b) a barrier for protecting the operator, said barrier being connected to said base; and, (c) gate means positioned adjacent said inclined surface for sliding vertically upon contact from said work piece and for maintaining a height above said base corresponding to said work piece while said work piece remains in said work zone.

2. A safety device as set forth in claim 1 wherein said gate means has a curved surface for contacting said work piece whereby said gate means is pushed upward by the camming action resulting from said work piece being inserted into said work zone and contacting said curved surface of said gate means.

3. A safety device as set forth in claim 2, wherein said gate means has at least one substantially vertically-oriented slot, and fastening means passing through each said slot and attaching to said base.

4. A safety device as set forth in claim 3 wherein said barrier comprises an upper frame member, at least one lower frame member and a plurality of vertically-oriented rod members, said rod members being integrally attached to said upper frame member and to at least one of said lower frame members.

5. A safety device as set forth in claim 4 wherein said barrier further comprises right and left vertically-oriented plates having edges and supporting angled rod members; said plates being attached to the rear-most of said vertically-oriented rod members and to said angled rod members, said angled rod members being attached to said lower frame member.

6. A safety device as set forth in claim 1 wherein said barrier has a lower portion, said lower portion being angle in toward said machine for permitting the insertion of a work piece which is shorter than the overall width of said safety device.

7. A safety device as set forth in claim 1, claim 2, claim 4 or claim 6 further comprising flange members attached to said base, wherein said machine further comprises a work bed and flange-lip members attached to said work bed and engaging said flange members, for slidably attaching said safety device to said machine.

8. A safety device as set forth in claim 7 further comprising a pivotal flange detent for holding said flange members in engagement with said flange-lip members.

9. A safety device as set forth in claim 8 wherein said pivotal flange detent has a spring-loaded mechanism for holding said flange members in engagement with said flange-lip members; said spring-loaded mechanism being operated by the machine operator for releasing said flange members from said flange-lip members allowing said safety device to be removed from said work area of said machine.

10. A safety device for protecting the operator of a machine, said machine having a work zone and a work bed with flange-lip members and a spring-loaded pivotal flange detent attached to said work bed, and being capable of receiving a work piece, said safety device comprising:

(a) a generally U-shaped base having right and left flange members attached thereto, and having an upper surface, right and left lower surfaces for receiving a work piece in said work zone, and right and left inclined surfaces connecting said upper surface to each of said lower surfaces;

(b) right and left support members mounted upon said base;

(c) a barrier mounted upon said support members, said barrier further comprising an upper frame member, one or more lower frame members and a plurality of vertically-oriented rod members, said rod members being integrally attached to said upper frame member and to at least one lower frame member, wherein the lower portion of said barrier is angled in toward said machine for permitting the insertion of a work piece which is shorter than the overall width of said safety device; and, (d) right and left slotted gate means vertically slidably mounted upon said lower barrier frame member, each of said gate means having a front curved surface for sliding vertically upon contact from said work piece and for maintaining a height above said base corresponding to said work piece while said work piece remains in said work zone, said device being slidably attached to said machine by the engagement of said flange and flange-lip members and said flange members being held in engagement with said flange-lip members by said spring-loaded pivotal flange detent.

* * * * *